(12) United States Patent
Ohba et al.

(10) Patent No.: US 7,840,240 B2
(45) Date of Patent: Nov. 23, 2010

(54) WIRELESS NETWORK NODE

(75) Inventors: Kohtaro Ohba, Ibaraki (JP); Shigeru Yamada, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 563 days.

(21) Appl. No.: 11/920,126

(22) PCT Filed: May 11, 2006

(86) PCT No.: PCT/JP2006/309492

§ 371 (c)(1),
(2), (4) Date: Nov. 9, 2007

(87) PCT Pub. No.: WO2006/121120

PCT Pub. Date: Nov. 16, 2006

(65) Prior Publication Data

US 2009/0103464 A1 Apr. 23, 2009

(30) Foreign Application Priority Data

May 11, 2005 (JP) .............................. 2005-167447

(51) Int. Cl.
*H04B 1/38* (2006.01)
(52) U.S. Cl. ...................................... 455/574; 370/314
(58) Field of Classification Search .................. 455/574, 455/127.5; 370/311, 312, 445, 314
See application file for complete search history.

(56) References Cited

U.S. PATENT DOCUMENTS

| 7,079,009 | B2 * | 7/2006 | Gallagher et al. .......... 340/10.2 |
| 7,315,522 | B2 * | 1/2008 | Wood, Jr. .................... 370/312 |
| 2006/0071757 | A1 * | 4/2006 | Burghard et al. ........... 340/10.2 |

FOREIGN PATENT DOCUMENTS

| JP | 2002-519876 A | 2/2003 |
| JP | 2003-115033 A | 4/2003 |
| JP | 2004-185601 A | 7/2004 |
| WO | WO-99/67735 | 12/1999 |

OTHER PUBLICATIONS

International Search Report mailed on Aug. 15, 2006.

* cited by examiner

*Primary Examiner*—Tu X Nguyen
(74) *Attorney, Agent, or Firm*—Rader, Fishman & Grauer PLLC

(57) ABSTRACT

A communication procedure has been developed that allows even a low-rate CPU to perform stable communication so as to realized wireless network nodes, which have a long communication distance and also have a long battery life. Each wireless network node decides its own time slot number by use of random numbers and transmits it after delaying the transmission by the number of time slots. When receiving the unique number from the wireless network node, a master unit transmits, to the wireless network node, an ACK signal together with the unique number. When receiving its unique number, the wireless network node gets into a sleep state for a period of time. In this way, each time communication is established, the number of active wireless network nodes is reduced.

16 Claims, 3 Drawing Sheets

WIRELESS NETWORK NODE

BACKGROUND OF THE INVENTION

1. Field of the Invention

The present invention relates to an RFID, a wireless tag, or a wireless network node that has an ID number or is equipped with a sensor.

2. Description of the Related Art

A small wireless network is generally called a wireless tag or an RFID. The small wireless network is divided into a passive type that does not have a battery, and an active type that requires a battery. The passive type may be regarded as a bar code system. The passive type RFID is mainly used when a master unit and a slave unit are disposed close to each other by several centimeters.

The passive type does not have a power supply and is supplied with energy from radio wave to be transmitted. Meanwhile, a so-called small wireless network node that is used in a sensor network is generally called the active type. The small wireless network node requires a battery but includes a transmitting/receiving circuit, thereby transmitting data in a wireless manner through a sensor. The wireless network node can perform data exchange with a network through the wireless network node itself. In addition, the active type has a communication distance much longer than the passive type, for example, tens of meters.

The passive type does not have a battery but needs a large antenna to increase a communication distance. In this case, strong radio wave may adversely affect other wireless apparatuses. The active type is appropriately used when a predetermined communication distance is needed in the wireless tag, but there is a problem in that a battery is needed. Accordingly, when battery consumption is low, and a battery does not need to be replaced for one year or more, the active type is often used, instead of the passive type.

In the related art, there are many disclosures on collision in the passive type (for example, Patent Document 2), but no disclosures on the active type. In addition, a power saving method is disclosed in Patent Document 1. According to this method, the same receiving circuit is used. Specifically, a power saving mode is changed to a normal mode at the first reception, and communication is performed at the second reception. In contrast, the present invention uses a communication procedure that can achieve anti-collision and power saving.

Patent Document 2: Japanese Patent Application Publication No. 2003-115033

Patent Document 2: Japanese Patent Application National Publication No. 2002-519876

The passive type wireless tag does not require a battery but has a short communication distance. In addition, a large transmitting antenna is needed to increase the communication distance, which causes an increase in transmission power. The increase in the transmission power adversely affects neighboring wireless apparatuses.

The active type wireless tag has a communication distance longer than the passive type, but it requires a battery. However, even though the battery is required when power consumption is reduced, the active type can be used according to the passive type. In order to reduce battery consumption, a low-rate CPU needs to be used, and thus it is necessary to perform power saving control in internal circuits.

To this end, it is necessary to allow even a low-rate CPU to perform wireless tag communication using the most simplified procedure. In addition, when a plurality of wireless tags exist in a communication area, the tags need to be individually identified. For this reason, there is a need for a communication procedure that can achieve power saving or a power saving method.

SUMMARY OF THE INVENTION

According to a first aspect of the invention, a wireless network node apparatus includes a transmitter, a receiver, and an interface for connection to the outside. When a master unit calls a wireless network node, the wireless network node generates a random number in response to the received call signal so as to prevent collision with other wireless network nodes, converts the random number into a time slot value, and transmits its unique number to the master unit at that time slot by return. When receiving the unique number, the master unit transmits, to the wireless network node, the unique number of the wireless network node by return. When receiving the return unique number from the master unit, the wireless network node shuts off the power supply to a transmitting/receiving circuit for a predetermined time. In the wireless network node, the master unit transmits the power supply shutoff time of the transmitting/receiving circuit of the wireless network node according to the priority of the wireless network node when transmitting the unique number to the wireless network node by return.

According to a second aspect of the invention, in the wireless network node apparatus according to the first aspect of the invention, the master unit may transmit an upper limit value of the random number when transmitting the unique number to the wireless network node by return, and may change the number of time slots.

According to a third aspect of the invention, in the wireless network node according to the first or second aspect of the invention, in addition to a general receiving circuit, an additional low-power receiving circuit may be provided, and when the additional low-power receiving circuit receives radio wave from the master unit at a different frequency, power may be supplied to the general transmitting/receiving circuit.

According to a fourth aspect of the invention, in the wireless network node apparatus according to any one of the first to third aspects of the invention, when radio wave is transmitted from the master unit to the wireless network node so as to change the unique number of the wireless network node, the master unit may first transmit the unique number of the wireless network node to the wireless network node. At the timing when its unique number is received, the wireless network node may transmit, to the master unit, that it is ready to change the unique number. The master unit may transmit the changed unique number to the wireless network node again. When receiving the changed unique number, the wireless network node may perform a procedure for changing its unique number.

According to a fifth aspect of the invention, in the wireless network node according to any one of the first to fourth aspects of the invention, when the wireless network node is attached to an object or a person, a camera for capturing a still picture or a moving picture may be provided in the master unit, and an image of the object or the person who carries the wireless network node may be captured by the camera at the same time the unique number of the wireless network node from the master unit according to claim 5 is changed or the master unit reads the wireless network node.

According to a sixth aspect of the invention, in the wireless network node according to any one of the first to fifth aspects of the invention, when the master unit issues the unique number of the wireless network node, the unique number may be generated from the number of the master unit, time, or the unique state of the wireless network node for the master unit or the slave unit.

According to a seventh aspect of the invention, in the wireless network node according to any one of the first to sixth aspects of the invention, a sensor may be attached to the master unit so as to detect the temperature or the state of an object or a person, and when the sensor shows a reaction or the unique number of the wireless network node is received, or when the sensor shows the reaction while the unique number of the wireless network node is not received, the master unit may perform a prescribed operation.

According to an eighth aspect of the invention, in the wireless network node according to any one of the first to seventh aspects of the invention, a relay wireless network node may be provided between the master unit and the wireless network node so as to prevent a radio wave coverage from being reduced due to noise around the master unit, and to improve a communication distance.

According to a ninth aspect of the invention, in the wireless network node according to any one of the first to eighth aspects of the invention, a sensor may be attached to the slave unit so as to detect a slope or a movement, and when the sensor shows a reaction, the slave unit may perform a prescribed operation.

According to claim 1, even if a low-rate CPU is provided in the wireless network node, communication can be established by using a simple procedure. In addition, even if a plurality of wireless network nodes exist within a reception area of the master unit, the slave units reply simultaneously in response to the call signal of the master unit, such that collision rarely occurs. Furthermore, since a wireless network node that completes communication temporarily stops, there is a strong possibility that a wireless network node, which does not complete communication, communicates with the master unit. Furthermore, the stop time can be adjusted, thereby reducing battery consumption.

According to claim 2, the number of time slots can be changed by the number of wireless network nodes. When a small number of wireless network nodes exist, communication collision rarely occurs, and the number of time slots is small. When a large number of wireless network nodes exist, since collision is likely to occur, the number of time slots needs to be increased. The master unit can adjust the number of time slots according to applications or occasions, and thus better application of the wireless network node system can be realized.

According to claim 3, power saving can be achieved. Generally, a transmission/reception stop circuit is provided and starts for each period of time so as to determine whether or not a radio wave exists. If a radio wave exists, a normal reception state is set. Otherwise, a stop state is set. According to this method, the longer the stop time is, the more power saving is made. During the start, in the worst case, it waits for the stop time, and accordingly the response of the wireless tag may be lowered. In the method according to the third aspect of the invention, the additional low-power receiving circuit is provided in the wireless network node. Then, power is supplied to the main circuit at the timing at which a radio wave is input to the additional receiving circuit, while the main receiving circuit constantly stops. According to this method, the additional receiving circuit does not receive data, thereby forming a low-power circuit. Therefore, it is possible to form a fast-responsive and low-power wireless network node.

Claim 4 is to change the unique number of the wireless network node. The change of the unique number is performed by a two-step method for safety. For the first time, the wireless network node is allowed to be readied to change the unique number, and only the wireless network node ready to change the unique number actually changes the unique number, thereby ensuring safety.

According to claim 5, security can be realized. For example, when a person possesses a wireless network node, during a check of work hours, he/she may let another person have the wireless network node to manipulate the work hours without proper authorization. In order to prevent this unauthorized manipulation, an authentication station is provided. Then, if the person who possesses the wireless network node approaches the authentication station, the authentication station reads the wireless network node and simultaneously captures an image of his/her face, and matches the unique number of the wireless network node with facial data. When a security system that uses a wireless network node is used, the face and the record of the face are left and used to check for unauthorized manipulation later.

According to claim 6, the facial image is recorded according to claim 5, the unique number of the wireless network node is allowed to have an attribute and a unique number having added thereto an authentication station number or time is issued. This unique number is recorded as a unique number, which can be used only one time, in the manner of a one-time password, to thereby prevent an unauthorized use of the unique number of the wireless network node.

DESCRIPTION OF THE PREFERRED EMBODIMENTS

Figure 1:
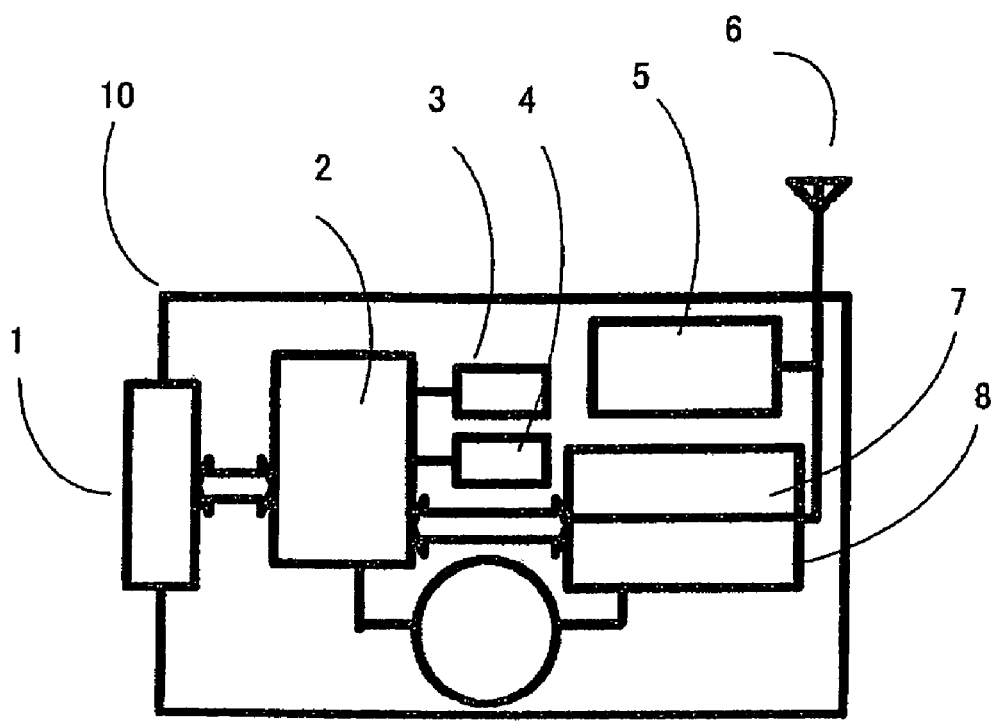
FIG. 1 is a diagram showing a wireless network node according to an embodiment of the invention.
Figure 2:
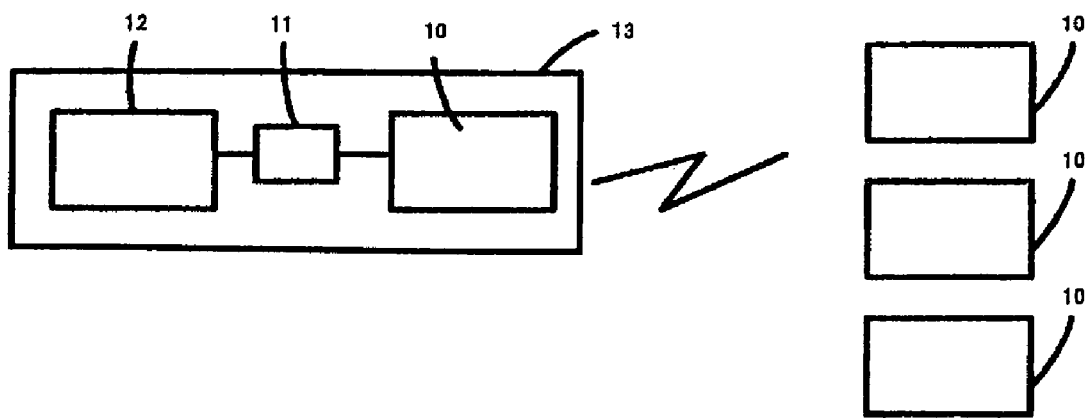
FIG. 2 is a diagram showing a wireless network node and a master unit according to an embodiment of the invention.
Figure 3:
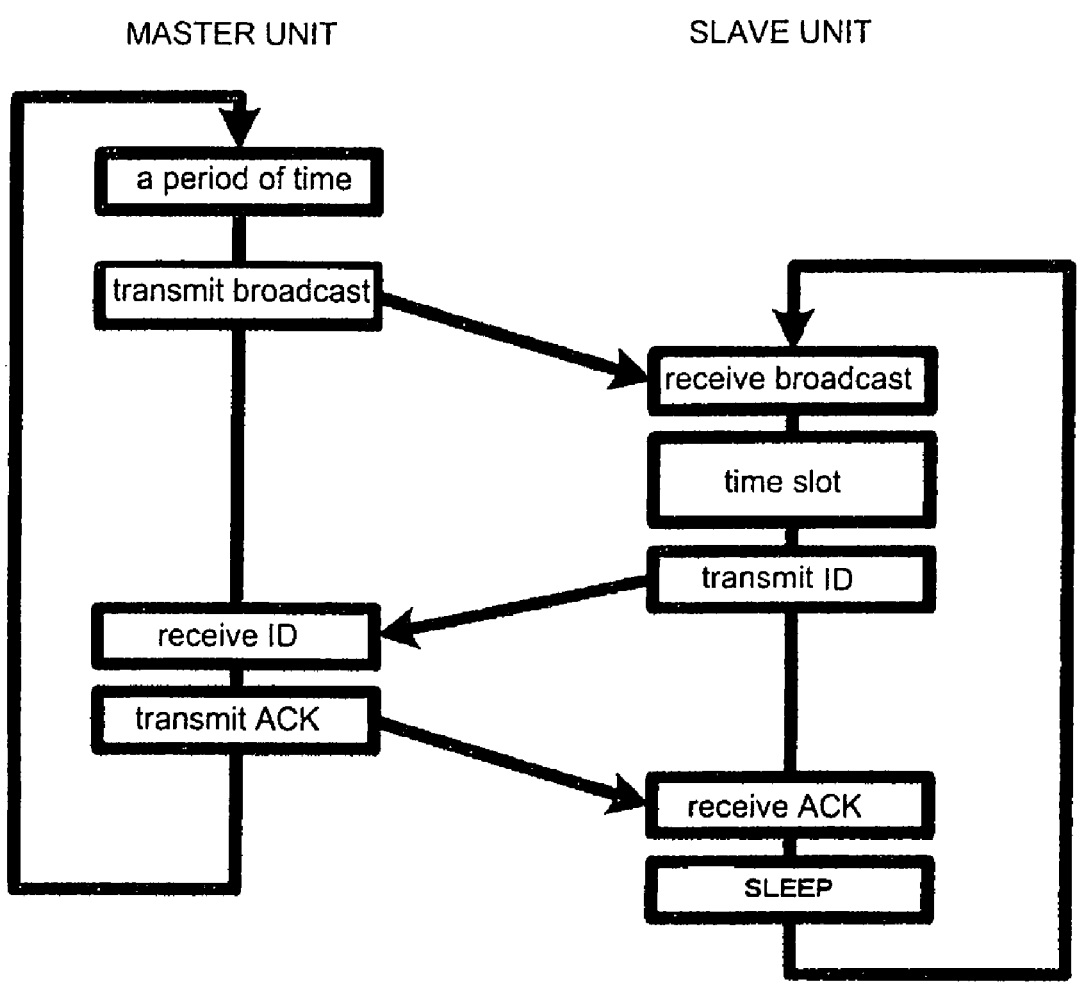
FIG. 3 is a flowchart illustrating a communication procedure.

Hereinafter, the invention will be described in detail by way of an embodiment with reference to the drawings. FIG. 1 is a block diagram showing the configuration of a tag according to an embodiment of the invention. FIG. 2 is an explanatory view illustrating an example where a tag according to an embodiment of the invention is used. FIG. 3 is an explanatory view illustrating a flowchart of a communication procedure in a tag according to an embodiment of the invention. Moreover, the invention is not limited thereto.

In FIG. 1, reference numeral 10 denotes a wireless network node according to the invention. The wireless network node includes a sensor or an external I/O terminal 1 for connection to an external network, a CPU 2 that controls communication data, an external switch 3, an LED display 4, a transmitting circuit 7, a receiving circuit 8, a general loop antenna 5 or helical antenna 6, and a battery 9. These circuits are known circuits. In this configuration, a master unit and a slave unit use the same circuit.

As shown in FIG. 1, the wireless network node primarily includes an RF transmitting/receiving circuit and a CPU. A holder for a CR2032 lithium battery is provided, but an external battery may also be used. As an antenna, an external helical antenna or an internal loop antenna may be selected. An external I/O includes an RS232C transmission/reception interface, a general purpose I/O (GPIO), and a terminal for board programming of an internal CPU. When the wireless network node is used as a master unit, it may be connected by use of RS232C, or may be connected to a server through a hub in a network. When the wireless network node is used as a sensor network, a GPIO or a serial port may be used as an I2C bus interface for a digital temperature sensor.

A general communication procedure in FIG. 2 is as shown in FIG. 3. It is assumed that one master unit 10 and people or objects that carry wireless network nodes 10 exist within a communicatable space. When the unique numbers of them are loaded from the wireless network nodes to the network, a broadcast system is used. According to the broadcast system, as shown in FIG. 3, the master unit transmits a broadcast signal to all of the wireless network nodes at once. A wireless network node that receives the broadcast signal transmits its own unique number to the master unit. At this time, if all of the wireless network nodes transmit the unique numbers by return at once, collision of radio waves occurs, and accordingly communication is not performed. Accordingly, the wireless network nodes transmit the unique numbers according to a time-division multiple access (TDMA) system.

Each wireless network node decides its own time slot number by use of random numbers and transmits it after delaying the transmission by the number of time slots. When receiving the unique number from the wireless network node, the master unit transmits, to the wireless network node, an ACK signal together with the unique number. When receiving its unique number, the wireless network node gets into a sleep state for a period of time. In this way, each time communication is established, the number of active wireless network nodes is reduced.

Figure 4:
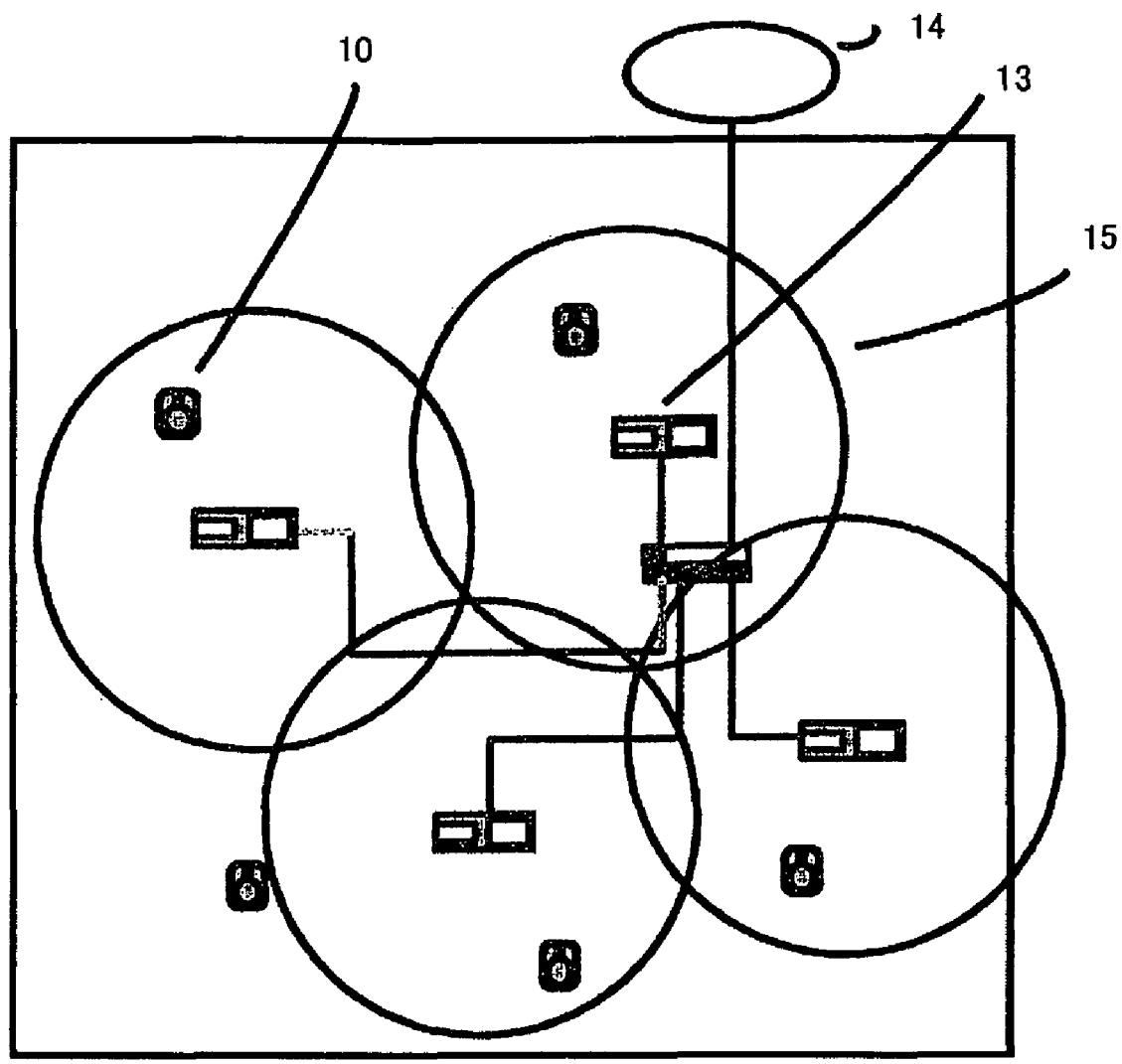
FIG. 4 is a diagram showing an example where a master unit is used in combination.

FIG. 4 shows an example where a master unit is provided within a range, which shows how far a radio wave from a hub reaches, thereby covering a necessary area. This configuration can be obtained by combining a small server device for a master unit and a wireless module. At the back of the master unit, a general network infrastructure is provided. In this example, it is possible to determine an area where a wireless network node having a particular unique number exists. Since the master unit generally has an IP address, it is possible to simply control the master unit by use of a telnet command.

A general purpose communication protocol does not need to be provided in the wireless network node. Since it is necessary to minimize energy consumption of the wireless network node, negotiation by standardization is not provided, and as a result, a simple communication method is used. On the network, standardization by middleware or API may be performed.

The wireless network node includes an external I/O, and if it is equipped with a sensor, it may be used as a sensor network node. When the sensor has a distortion gauge and is provided on a bridge or the like, data can be collected from the vehicles at given intervals. A digital two-wire temperature sensor may be directly connected to the wireless module. For example, for temperature management of fish and food items in a supermarket, it is not practical to attach a plurality of sensors in a wired manner. The temperature sensor using the wireless network node is installed by placing it at an appropriate place. Then, the master unit collects temperature data at given intervals.

In view of security, an existing network infrastructure may be excluded. For example, when a network failure occurs, the entire system stops. The wireless network node may be used as an original network node, or it may construct an independent network system through a repeater by using a multihop system. Accordingly, it is not affected by the existing network infrastructure. In addition, when an acceleration sensor is provided in the wireless network node, X and Y-axis slopes can be transmitted to the master unit in real time.

A wireless network node that has a communication quantity of ten-odd bytes including the ID and the like, and can stably perform communication at a distance of tens meters and be linked to the existing network is demanded on the market. An active type has a battery, but if the battery does not need to be replaced for three years or more, there are many fields where it can be used as an RFID without causing any problems. For example, in respects to oxen that come to the market at the age of three years, the battery does not have lifespan longer than the life of the oxen.

Ubiquitous technology is a technology that expands information communication to a place of a person or an object or their state. The wireless network node is extremely compact and can be attached to the person or the object. In addition, it can perform communication at a distance of ten-odd meters without using a reader/writer, and operate for several years with a lithium battery having a diameter of 20 mm. In respect to the wireless standard, a weak radio wave for which a wireless station is not requested is used. Functions, excluding transmission/reception, for example, data encoding, decoding, debugging, and modulation are performed with software by CPU. Accordingly, it can be used for various applications by replacing software.

What is claimed is:

1. A wireless network node, comprising:
   a transmitter;
   a receiver; and
   an interface for connection to the outside,
   wherein, when a master unit calls a wireless network node, the wireless network node generates a random number in response to the received call signal so as to prevent collision against other wireless network nodes, converts the random number into a time slot value, and transmits its unique number to the master unit at that time slot by return,
   when receiving the unique number, the master unit transmits, to the wireless network node, the unique number of the wireless network node by return,
   when receiving the return unique number from the master unit, the wireless network node shuts off the power supply to a transmitting/receiving circuit for a predetermined time, and
   the master unit transmits the power supply shutoff time of the transmitting/receiving circuit of the wireless network node according to the priority of the wireless network node when transmitting the unique number to the wireless network node by return.

2. The wireless network node according to claim 1, wherein the master unit transmits an upper limit value of the random number, that is, a change in the number of time slots, when transmitting the unique number to the wireless network node by return.

3. The wireless network node according to claim 2, wherein an additional low-power receiving circuit is provided in addition to a general receiving circuit, and when the additional low-power receiving circuit receives radio wave from the master unit at a different frequency, power is supplied to the general transmitting/receiving circuit.

4. The wireless network node according to claim 2, wherein, when radio wave is transmitted from the master unit to the wireless network node so as to change the unique number of the wireless network node, the master unit first transmits the unique number of the wireless network node to the wireless network node, at the timing when its unique number is received, the wireless network node transmits, to the master unit, that it is ready to change the unique number, the master unit transmits the changed unique number to the wireless network node again, and when receiving the changed unique number, the wireless network node performs a procedure for changing its unique number.

5. The wireless network node according to claim 2, wherein, when the wireless network node is attached to an object or a person, a camera for capturing a still picture or a moving picture may be provided in the master unit, and an image of the object or the person who carries the wireless network node is captured by the camera at the same time the unique number of the wireless network node from the master unit according to claim 5 is changed or the master unit reads the wireless network node.

6. The wireless network node according to claim 2, wherein, when the master unit issues the unique number of the wireless network node, the unique number is generated from the number of the master unit, time, or the unique state of the wireless network node for the master unit or the slave unit.

7. The wireless network node according to claim 2, wherein a sensor is attached to the master unit so as to detect the temperature or the state of an object or a person, and when the sensor shows a reaction and the unique number of the wireless network node is received, or when the sensor shows the reaction while the unique number of the wireless network node is not received, the master unit performs a prescribed operation.

8. The wireless network node according to claim 2, wherein a relay wireless network node is provided between the master unit and the wireless network node so as to prevent a radio wave coverage from being reduced due to noise around the master unit and to improve a communication distance.

9. The wireless network node according to claim 2, wherein a sensor is attached to the slave unit so as to detect a slope or a movement, and when the sensor shows a reaction, the slave unit performs a prescribed operation.

10. The wireless network node according to claim 1, wherein an additional low-power receiving circuit is provided in addition to a general receiving circuit, and when the additional low-power receiving circuit receives radio wave from the master unit at a different frequency, power is supplied to the general transmitting/receiving circuit.

11. The wireless network node according to claim 1, wherein, when radio wave is transmitted from the master unit to the wireless network node so as to change the unique number of the wireless network node, the master unit first transmits the unique number of the wireless network node to the wireless network node, at the timing when its unique number is received, the wireless network node transmits, to the master unit, that it is ready to change the unique number, the master unit transmits the changed unique number to the wireless network node again, and when receiving the changed unique number, the wireless network node performs a procedure for changing its unique number.

12. The wireless network node according to claim 1, wherein, when the wireless network node is attached to an object or a person, a camera for capturing a still picture or a moving picture may be provided in the master unit, and an image of the object or the person who carries the wireless network node is captured by the camera at the same time the unique number of the wireless network node from the master unit according to claim 5 is changed or the master unit reads the wireless network node.

13. The wireless network node according to claim 1, wherein, when the master unit issues the unique number of the wireless network node, the unique number is generated from the number of the master unit, time, or the unique state of the wireless network node for the master unit or the slave unit.

14. The wireless network node according to claim 1, wherein a sensor is attached to the master unit so as to detect the temperature or the state of an object or a person, and when the sensor shows a reaction and the unique number of the wireless network node is received, or when the sensor shows the reaction while the unique number of the wireless network node is not received, the master unit performs a prescribed operation.

15. The wireless network node according to claim 1, wherein a relay wireless network node is provided between the master unit and the wireless network node so as to prevent a radio wave coverage from being reduced due to noise around the master unit and to improve a communication distance.

16. The wireless network node according to claim 1, wherein a sensor is attached to the slave unit so as to detect a slope or a movement, and when the sensor shows a reaction, the slave unit performs a prescribed operation.

\* \* \* \* \*